(12) United States Patent
Severson et al.

(10) Patent No.: US 9,793,767 B2
(45) Date of Patent: Oct. 17, 2017

(54) METHOD AND ASSEMBLY FOR COOLING AN ELECTRIC MACHINE

(71) Applicant: Hamilton Sundstrand Corporation, Charlotte, NC (US)

(72) Inventors: Mark Hamilton Severson, Rockford, IL (US); Debabrata Pal, Hoffman Estates, IL (US); Joseph Kenneth Coldwate, Roscoe, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 293 days.

(21) Appl. No.: 14/662,458

(22) Filed: Mar. 19, 2015

(65) Prior Publication Data
US 2016/0276882 A1 Sep. 22, 2016

(51) Int. Cl.
*H02K 9/00* (2006.01)
*H02K 1/20* (2006.01)
*H02K 5/18* (2006.01)
*H02K 9/06* (2006.01)

(52) U.S. Cl.
CPC ............... *H02K 1/20* (2013.01); *H02K 5/18* (2013.01); *H02K 9/06* (2013.01)

(58) Field of Classification Search
CPC ............ H02K 1/20; H02K 9/16; H02K 5/18
USPC ...... 310/52, 54, 58, 64, 62, 63, 60 R; 29/596
See application file for complete search history.

(56) References Cited

U.S. PATENT DOCUMENTS

| | | | |
|---|---|---|---|
| 2,818,515 A | 12/1957 | Dolenc | |
| 3,436,579 A | 4/1969 | Gaensbauer et al. | |
| 5,019,733 A * | 5/1991 | Kano | H02K 9/19 310/52 |
| 5,363,002 A | 11/1994 | Hernden et al. | |
| 5,557,153 A * | 9/1996 | Zimmermann | H02K 9/26 310/56 |
| 5,869,912 A * | 2/1999 | Andrew | H02K 1/20 310/52 |
| 7,633,194 B2 | 12/2009 | Dawsey et al. | |
| 8,053,938 B2 | 11/2011 | Pal et al. | |
| 8,459,966 B2 | 6/2013 | Hipsky et al. | |
| 8,519,578 B2 | 8/2013 | Pal | |
| 8,729,751 B2 | 5/2014 | Telakowski et al. | |
| 8,901,791 B2 | 12/2014 | Saban et al. | |
| 2003/0071525 A1* | 4/2003 | Tong | H02K 1/20 310/65 |
| 2007/0024129 A1 | 2/2007 | Pfannschmidt | |
| 2008/0100159 A1* | 5/2008 | Dawsey | H02K 1/20 310/54 |

(Continued)

FOREIGN PATENT DOCUMENTS

WO 20140194060 12/2014

OTHER PUBLICATIONS

EP Extended Search Report for European Application No. 16161326.0-1905 dated Aug. 1, 2016.

*Primary Examiner* — Hanh Nguyen
(74) *Attorney, Agent, or Firm* — Carlson, Gaskey & Olds, P.C.

(57) ABSTRACT

In one exemplary embodiment, an electric machine includes a stator having a plurality of axial protrusions forming a plurality of stator cooling channels on a radially outer surface of the stator and a tapered portion located adjacent a distal end of at least one of the plurality of protrusions. Additionally, the disclosure includes a method for cooling the electric machine.

14 Claims, 3 Drawing Sheets

(56) References Cited

U.S. PATENT DOCUMENTS

| | | | |
|---|---|---|---|
| 2008/0231126 A1* | 9/2008 | Telore | H02K 5/20 |
| | | | 310/59 |
| 2010/0156205 A1* | 6/2010 | Davis | H02K 11/048 |
| | | | 310/46 |
| 2010/0207465 A1* | 8/2010 | Dutau | H02K 1/20 |
| | | | 310/64 |
| 2010/0283334 A1 | 11/2010 | Lemmers, Jr. et al. | |
| 2013/0119829 A1 | 5/2013 | Andersen | |
| 2013/0278092 A1 | 10/2013 | Coldwate et al. | |
| 2014/0042842 A1 | 2/2014 | Tokoi | |
| 2014/0069099 A1* | 3/2014 | Rohwer | H02K 5/20 |
| | | | 60/714 |
| 2014/0117798 A1 | 5/2014 | Coldwate et al. | |
| 2014/0265665 A1 | 9/2014 | Maynez | |

* cited by examiner

METHOD AND ASSEMBLY FOR COOLING AN ELECTRIC MACHINE

BACKGROUND

Electric machines typically comprise a stator element and a rotor element that interact electro-magnetically to convert electric power to mechanical power or to convert mechanical power to electrical power. For example, a conventional stator element comprises an annular housing having windings of copper coils circumferentially oriented. A conventional rotor element is mounted on a shaft for rotation. Electric current is passed through the stator windings to generate an electro-magnetic field that causes the rotor and shaft to rotate about an axis of rotation of the shaft. The electric current causes resistance heating of the coils, which heats the entire electric machine including the rotor. In particular, high power electric motors that operate at high speeds and are compact in size generate high heat densities.

Conventional schemes for cooling electric machines involve passing cooling fluid over the stator, which is typically easy to accomplish because of the stationary and exterior nature of the stator assembly. Rotors are typically cooled by passing cooling fluid between the stator and rotor. Such cooling schemes, however, often provide inadequate cooling for rotors used in high power motors due to high rotor heat density. In addition, as the size of high power motors decreases, the available area for passing cooing air between the stator and rotor also decreases. There is therefore a need to improve cooling efficiency in electric machines.

SUMMARY

In one exemplary embodiment, an electric machine includes a stator having a plurality of axial protrusions forming a plurality of stator cooling channels on a radially outer surface of the stator and a tapered portion located adjacent a distal end of at least one of the plurality of protrusions. Additionally, the disclosure includes a method for cooling the electric machine.

These and other features of the disclosed examples can be understood from the following description and the accompanying drawings, which can be briefly described as follows.

DETAILED DESCRIPTION

Figure 1:
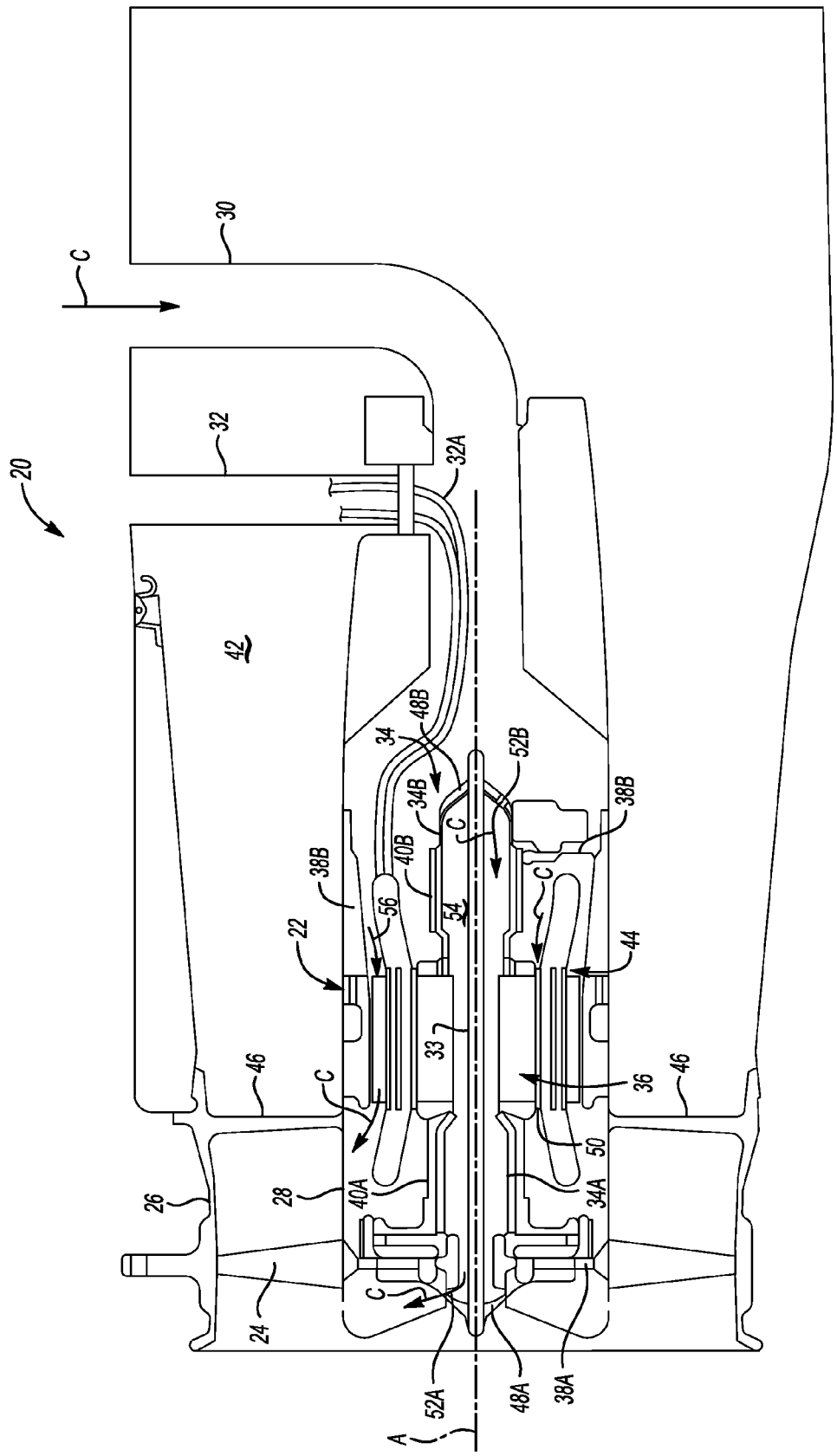
FIG. 1 is a sectional view of a fan assembly having an electric machine.

As shown in FIG. 1, a fan assembly 20 is driven by an electric machine 22. The fan assembly 20 includes a fan impeller 24, an outer housing 26, an inner housing 28, a cooling air tube 30, and an electrical conduit 32 in electrical communication with the electric machine 22. Although the electric machine 22 shown in the illustrated examples is an electric motor, this disclosure also applies to cooling an electric generator or another device that includes a stator.

The electric machine 22 includes a shaft 34 spaced radially inward from a rotor 36 and a stator 44 spaced radially outward from the rotor 36. The shaft 34 is attached to the rotor 36 such that the shaft 34 and the rotor 36 rotate together. The shaft 34 includes a forward shaft portion 34A located axially forward from an aft shaft portion 34B relative to an axis of rotation A of the electric machine 22. The forward shaft portion 34A is mounted to a forward motor support 38A located within the inner housing 28 by a forward bearing assembly 40A and the aft shaft portion 34B is mounted to an aft motor support 38B located within the inner housing 28 by an aft bearing assembly 40B.

The outer housing 26 forms an annular duct 42 with the inner housing 28 in which the fan impeller 24 is disposed to drive air through the fan assembly 20. The electrical conduit 32 extends through the annular duct 42 and allows access to the stator 44 by passing through the inner housing 28 and outer housing 26 to provide an electrical connection with the stator 44 and a power source. The cooling air tube 30 also extends through the annular duct 42 and allows cooling air C from a cooling air source outside of the fan assembly 20 to reach the electric machine 22, which is surrounded by the annular duct 42. The cooling air source could include room air or another air source.

The inner housing 28 is concentrically mounted within the outer housing 26 by a support structure 46 which extends radially between a radially outer facing surface of the inner housing 28 and a radially inner facing surface of the outer housing 26. The forward and aft motor supports 38A and 38B are mounted to a radially inner facing surface of the inner housing 28 and include portions for supporting the stator 44 and the forward and aft bearing assemblies 40A and 40B. The stator 44 and the forward and aft bearing assemblies 40A and 40B are mounted to radially inward facing surfaces of motor supports 38A and 38B. The forward and aft shaft portions 34A and 34B are positioned within the forward and aft bearing assemblies 40A and 40B and extend axially and concentrically with the axis of rotation A.

A tie rod 33 secures the forward shaft portion 34A relative to the aft shaft portion 34B through the application of a tensile force through the tie rod 33. The tie rod 33 extends through a center of the forward shaft portion 34A and a center of the aft shaft portion 34B and engages a forward end cap 48A adjacent the forward shaft portion 34A and an aft end cap 48B adjacent the aft shaft portion 34B. The forward end cap 48A connects the fan impeller 24 to the forward shaft portion 34A so that the fan impeller 24 will rotate with the forward and aft shaft portions 34A and 34B and the rotor 36.

The rotor 36 is mounted to a radially outward facing surface of the aft shaft portion 34B and faces toward the stator 44. A small gap between the rotor 36 and the stator 44 forms a rotor cooling passage 50 that permits the cooling air C from the cooling air tube 30 to flow around the rotor 36 and through the electric machine 22.

Electrical wiring 32A extends through the electrical conduit 32 and connects to the stator 44 to energize coil windings with electrical current. The energized coil windings exert an electro-magnetic flux field on the rotor 36. The flux field causes the rotor 36 to rotate about the axis of rotation A on the shaft 34. The tie rod 33 rotates with the forward and aft shafts portions 34A and 34B and the rotor 36. The forward and aft shaft portions 34A and 34B and the rotor 36 rotate on the forward and aft bearing assemblies 40A and 40B and cause the fan impeller 24 to rotate in the annular duct 42 and push air between the inner and outer housings 28 and 26.

The electric current provided to the stator 44 generates heat within the electric machine 22. Stator cooling channels 56 allow the cooling air C to flow around a radially outer surface or back iron of the stator 44 between the stator 44 and the inner housing 28 to provide convective cooling to the stator 44. The stator cooling channels 56 extend an entire length of the stator 44.

A shaft cooling passage 54 also permits the cooling air C to enter the shaft 34 through a shaft inlet 52B that extends through the aft end cap 48B. The cooling air C exits at the interior cavity of the shaft 34 through a shaft outlet 52A in the forward end cap 48A. The shaft cooling passage 54 allows the cooling air C to flow along the interior of the forward and aft shaft portions 34A and 34B to provide convective cooling to the forward and aft shaft portions 34A and 34B as well as the rotor 36.

The tie rod 33 extends through the shaft cooling passage 54 concentrically with the forward and aft shaft portions 34A and 34B along the axis of rotation A. The diameter of the tie rod 33 is smaller than that of shaft cooling passage 54 such that a spacing is present between the tie rod 33 and the forward and aft shaft portions 34A and 34B, which permits the cooling air C to pass through the shaft cooling passage 54.

Figure 2:
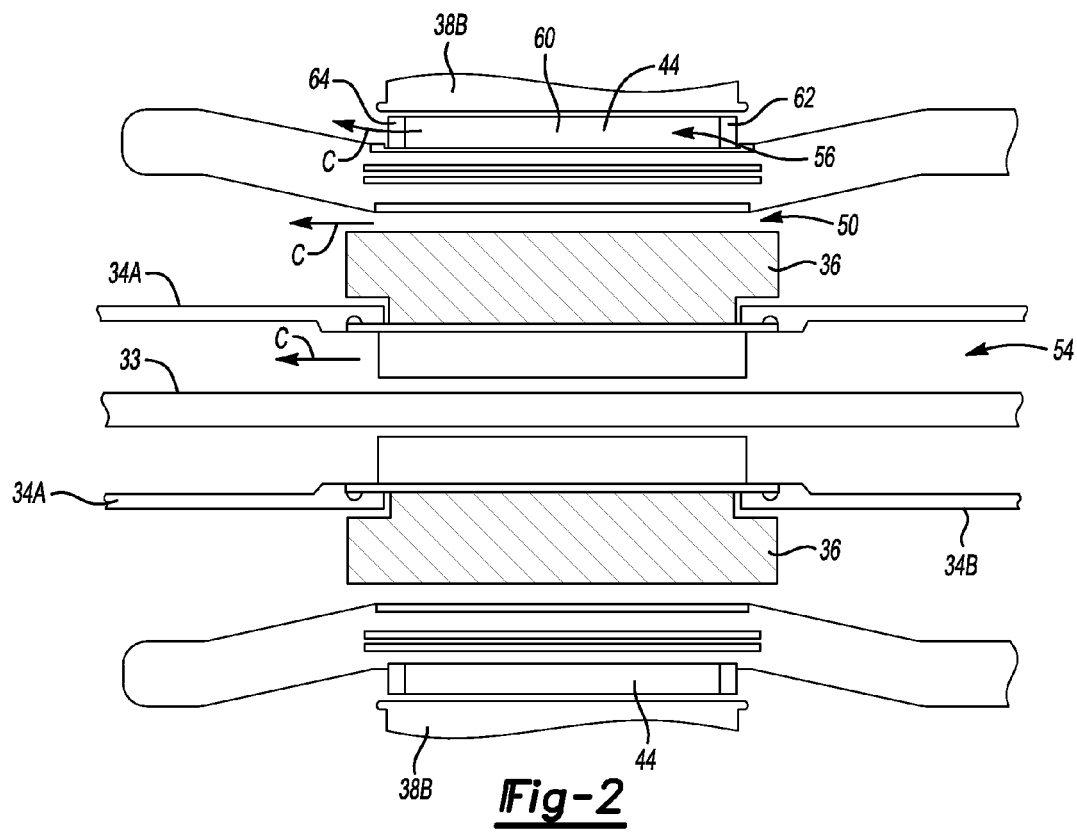
FIG. 2 is an enlarge view of the electric machine of FIG. 1.

As shown in FIG. 2, the electric machine 22 is cooled by the cooling air C flowing through the shaft cooling passage 54, the rotor cooling passage 50, and the stator cooling channel 56. Although the invention is described with respect to the use of cooling air C, other cooling fluids, such as liquid or gas, may be used in other embodiments.

As shown in FIG. 2, the electric machine 22 is cooled by the cooling air C flowing through the shaft cooling passage 54, the rotor cooling passage 50, and the stator cooling channel 56 as parallel flow circuits. The incoming cooling flow C is divided amongst the shaft cooling passage 54, the rotor cooling passage 50, and the stator cooling channel 56 based on their contribution to the total flow resistance. Therefore, in order to increase cooling of the stator 44 adjacent the stator cooling channel 56, a flow rate of the cooling air C through the stator cooling channel 56 would need to increase.

The stator cooling channels 56 are formed by pairs of protrusions 60, such as fins, that extend from a radially outer side of the stator 44 and form channels that defines each of the stator cooling channels 56. In one example, a radially outer side of the stator cooling channel 56 is defined by the radially inward facing surface of the motor support 38B and in another example, the radially outer side of the stator cooling channel 56 is defined by the inner housing 28. The perimeter of the stator cooling channels 56 are a feature of the motor laminations (thin iron plates), and the channels achieve their length when numerous laminations are stacked together to form the motor core. Because the stator cooling channels 56 are formed by a series of stacked laminations that are usually die-punched from sheet stock raw material, the entrances and exits of each stator cooling channel are largely sharp-edged. The sharp-edge orifices at each cooling channel may lead to significant pressure-drop losses that reduce the amount of cooling flow that actually enter them.

In the illustrated example, the distal ends of the stator cooling channel 56 taper adjacent distal ends of the protrusions 60 to form an inlet 62 and an outlet 64. The taper at the inlet 62 of the stator cooling channel 56 creates an area of decreasing cross-sectional area as the cooling air C enters the stator cooling channel 56. The change in cross-sectional area in the inlet 62 provides a gradual transition for the cooling air C entering the stator cooling channel 56 which increases the flow rate of the cooling air C into the stator cooling channel 56 by reducing the pressure drop associated with the entrance losses of sharp-edge orifices Conversely, the outlet 64 includes an increasing cross-sectional area as the cooling air C moves from the stator cooling channel 56 out of the stator 44. The change in cross-sectional area in the outlet 64 provides a gradual transition for the cooling air exiting the stator cooling channel 56 which increases the flow of the cooling air C into the stator cooling channel 56 by reducing the pressure drop associated with the exit losses of sharp-edge orifices.

Figure 3:
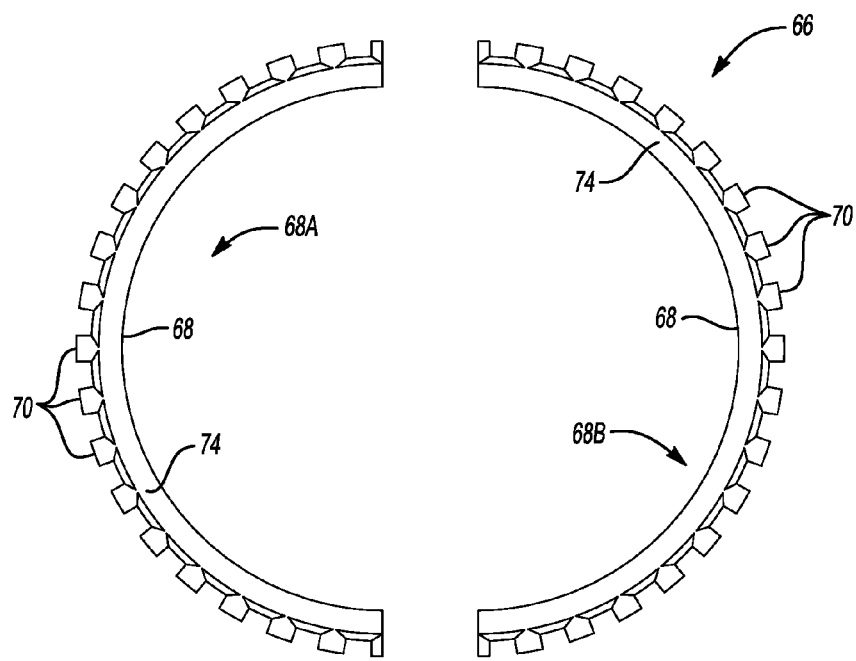
FIG. 3 is an example ring from the electric machine of FIG. 1.

FIG. 3 illustrates a ring 66 formed by two separate ring halves and 68B that can be located on opposing ends of the stator 44 to form the inlets 62 and the outlets 64 to the stator cooling channels 56. Although the ring 66 is formed by the two ring halves 68A and 68B in the illustrated example, the ring 66 could be formed from a single piece of material or more than two pieces of material.

Figure 4:
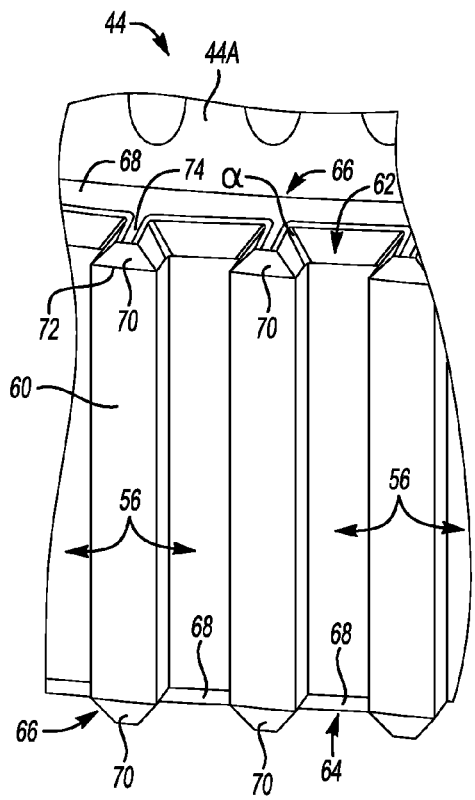
FIG. 4 is a partial perspective view of the ring of FIG. 3 on an example stator.

As shown in FIGS. 3 and 4, the ring 66 includes a ring portion 68 and a multitude ring protrusions 70 that extend radially outward from the ring portion 68 and are circumferentially spaced around an outer perimeter of the ring portion 68. The ring 66 attaches to a distal end 44A of the stator 44. The ring protrusions 70 are circumferentially aligned with a corresponding one of the protrusions 60 on the stator 44.

Each of the ring protrusions 70 include a first axial face 72 that engages one of the protrusions 60 on the stator 44 and tapers toward a second axial face 74 spaced from the first axial face 72. The first axial face 72 has a corresponding cross-sectional area to the distal end of the protrusion 60. The ring protrusions 70 taper at an angle α as shown in FIG. 4. In the illustrated example, the angle α is approximately 35 degrees. In another example, the angle α is between approximately 25 degrees and approximately 45 degrees. The angle α of the taper continues from the ring protrusion 70 onto the ring portion 68 such that the ring portion 68 also includes a taper adjacent the stator cooling channel 56 at the angle α.

Figure 5:
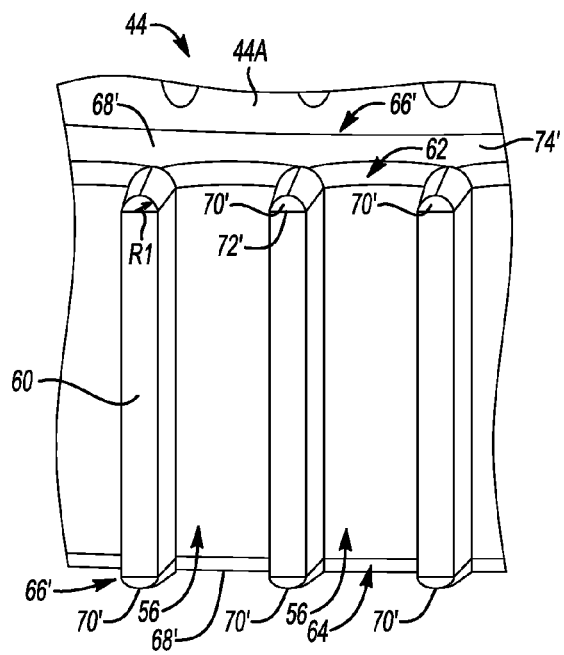
FIG. 5 is partial perspective view of another example ring on the example stator.

FIG. 5 illustrates another example ring 66'. The ring 66' is similar to the ring 66 except where shown in the Figures or described below. The ring 66' includes a ring portion 68' and a multitude of ring protrusions 70' extending from the ring portion 68'. The ring 66' attaches to the distal end 44A of the stator 44 and includes the ring protrusions 70' that extend radially outward from the ring portion 68' that are circumferentially aligned with a corresponding one of the protrusions 60 on the stator 44.

Each of the ring protrusions 70' include a first axial face 72' that engages one of the protrusions 60 on the stator 44 and tapers toward a second axial face 74' spaced from the first axial face 72'. The first axial face 72' has a corresponding cross-sectional area as the distal end of the protrusion 60. The ring protrusions 70' taper with a radius of curvature R1. The radius of curvature R1 continues onto the ring portion 68' such that the ring portion 68' also includes a taper adjacent the stator cooling channel 56 with a radius of curvature of R1.

Figure 6:
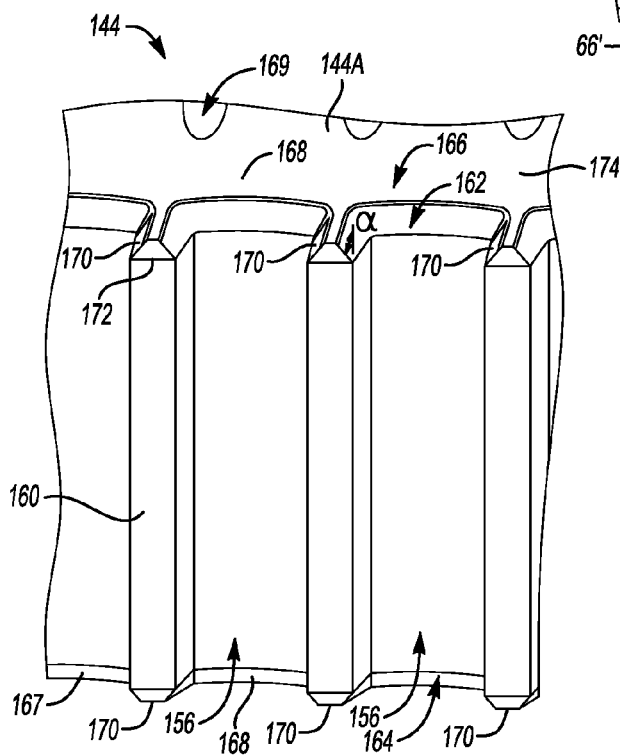
FIG. 6 is a partial perspective view of another example stator.

FIG. 6 illustrates another example stator 144 with an inlet 162 formed into a first distal end lamination 166 and an outlet 164 formed into a second distal end lamination 167. Each of the first distal end lamination 166 and the second distal end lamination 167 includes a disk 168 and a multitude of protrusions 170 that extend radially outward from the disk 168 and are circumferentially spaced around an outer perimeter of the disk 168. The disk 168 includes multitude of winding openings 169 for accepting stator windings. The protrusions 170 are circumferentially aligned with a corresponding one of a multitude of protrusions 160 on the stator 144.

Each of the protrusions 170 include a first axial face 172 that engages one of the protrusions 160 on the stator 144 and tapers toward a second axial face 174 spaced from the first axial face 172. The first axial face 172 has a corresponding cross-sectional area to the distal end of the protrusion 160. The protrusions 170 taper at an angle $\alpha$. In the illustrated example, the angle $\alpha$ is approximately 35 degrees. In another example, the angle $\alpha$ is between approximately 10 degrees and approximately 60 degrees. The angle $\alpha$ of the taper continues from the protrusion 170 onto the disk 168 such that the disk 168 also tapers toward stator cooling channels 156 at the angle $\alpha$. Additionally, the multitude of protrusions 170 and the disk 168 could have a radius similar to the ring protrusions 70' extending from the ring portion 68' as shown in FIG. 5.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An electric machine comprising:
   a stator including a plurality of axial protrusions forming a plurality of stator cooling channels on a radially outer surface of the stator; and
   a ring including a tapered portion located adjacent an axial inlet end of the stator forming an inlet to the plurality of stator cooling channels, wherein the tapered portion includes a decreasing cross-sectional area with a first cross-sectional area adjacent an outer axial end of the ring being larger than a second cross-sectional area spaced axially from the outer axial end of the ring.

2. The electric machine of claim 1, wherein the ring includes a plurality of protrusions extending from a ring portion and the tapered portion is located on the plurality of protrusions and the ring portion.

3. The electric machine of claim 1, further comprising an outlet ring having an outlet tapered portion located adjacent an axial outlet end to the stator cooling channels, the outlet tapered portion includes an increasing cross-sectional area such that a first outlet cross-sectional area adjacent the axial outlet end of the stator cooling channels is smaller than a second cross-sectional area spaced axially from the axial outlet end.

4. The electric machine of claim 3, wherein at least one of the ring and the outlet ring is formed in a lamination of the stator.

5. The electric machine of claim 1, wherein the tapered portion extends at an angle of 10 degrees to 60 degrees relative to one of the plurality of stator cooling channels.

6. The electric machine of claim 1, wherein the tapered portion includes a radius of curvature.

7. The electric machine of claim 1, further comprising a shaft having a shaft cooling passage and a rotor having a rotor cooling passage.

8. The electric machine of claim 1, wherein the ring includes a plurality of protrusions extending from a ring portion and the tapered portion is located on at least one the plurality of protrusions and the ring portion.

9. A method of cooling an electric machine comprising:
   directing a cooling fluid through a stator cooling channel in a stator; and
   increasing a flow rate by tapering at least one of an inlet or an outlet to the stator cooling channel with a ring including a tapered portion located adjacent an axial end of the stator forming a passage in communication with the stator cooling channel, wherein the tapered portion includes a first cross-sectional area adjacent an axial outer end of the ring being larger than a second cross-sectional area spaced axially from the outer axial end of the ring.

10. The method of claim 9, further comprising directing the cooling air through the outlet of the stator cooling channel, wherein the outlet includes an increasing cross-sectional area.

11. The method of claim 10, further comprising directing cooling air through a rotor cooling passage located between a rotor and the stator.

12. The method of claim 11, further comprising directing cooling air through a shaft cooling passage located radially inward from the rotor.

13. The method of claim 9, wherein the stator including a plurality of axial protrusions that at least partially define the stator cooling channel.

14. The method of claim 9, wherein the ring includes a plurality of protrusions extending from a ring portion and the tapered portion is located on at least one of the plurality of protrusions and the ring portion.

\* \* \* \* \*